United States Patent
O'Rourke

(10) Patent No.: US 6,755,700 B2
(45) Date of Patent: Jun. 29, 2004

(54) RESET SPEED CONTROL FOR WATERCRAFT

(75) Inventor: Maurice C. O'Rourke, Winnipeg (CA)

(73) Assignee: Modevation Enterprises Inc., Winnipeg (CA)

(*) Notice: Subject to any disclaimer, the term of this patent is extended or adjusted under 35 U.S.C. 154(b) by 0 days.

(21) Appl. No.: 10/435,355

(22) Filed: May 13, 2003

(65) Prior Publication Data

US 2004/0092179 A1 May 13, 2004

Related U.S. Application Data

(60) Provisional application No. 60/425,289, filed on Nov. 12, 2002.

(51) Int. Cl.[7] .................................................. B60L 15/20
(52) U.S. Cl. ............................................................ 440/7

(56) References Cited

U.S. PATENT DOCUMENTS

| | | | |
|---|---|---|---|
| 3,995,579 A | * 12/1976 | Childre | 440/7 |
| 5,892,338 A | 4/1999 | Moore et al. | |
| 6,054,831 A | 4/2000 | Moore et al. | |
| 6,126,497 A | 10/2000 | Stockton | |
| 6,190,216 B1 | 2/2001 | King | |

* cited by examiner

Primary Examiner—Ed Swinehart

(74) Attorney, Agent, or Firm—Aikins Patent Company; Murray E. Thrift

(57) ABSTRACT

A foot-operated control for controlling both speed and steering of a trolling motor for a watercraft, the foot-operated control in communication with the trolling motor and comprising a base and a foot interface. The foot interface is pivotally connected at a generally central point by a pivot to the base, the pivot separating and defining a first end and second end of the foot interface, such that depressing the first end directs the trolling motor to steer the watercraft to the right and depressing the second end directs the trolling motor to steer the watercraft to the left. The control further comprises a power supply connected to the base, a power activation means for activating the foot-operated control, a base speed set means for pre-setting a base speed level, a reset speed set means for pre-setting a reset speed amount, a base speed activation means for directing the trolling motor to operate at the base speed level, and a reset speed activation means for directing the trolling motor to operate at a speed beyond the base speed level by the reset speed amount. By enabling both an operator-adjustable pre-set base speed and an additional operator-adjustable pre-set reset speed amount, the control allows an operator to anticipate shifting environmental conditions such as wind gusts and changing water currents and be able to increase the trolling motor speed by a precise, controlled amount to counter such conditions at the touch of a switch, and eliminate the added speed when the conditions have abated with the release or second touch of the switch without the operator's attention being diverted away from the focus of fishing.

17 Claims, 3 Drawing Sheets

RESET SPEED CONTROL FOR WATERCRAFT

CROSS REFERENCE TO RELATED APPLICATIONS

This application claims priority from U.S. provisional application No. 60/425,289, filed Nov. 12, 2002.

FIELD OF THE INVENTION

The present invention relates to trolling motors, and more particularly to speed control devices for use with watercraft employing trolling motors.

BACKGROUND OF THE INVENTION

For a number of years, persons involved in sport and recreational fishing have employed trolling motors to enable relatively fine control of their watercraft. Such trolling motors allow for control of both watercraft speed and positioning, enabling the person to maintain a desired location, position, or speed as required for the most effective fishing experience. While trolling motors have traditionally been hand-operated, electronic models of cable or radio-controlled varieties have been developed to improve the ease of watercraft control.

The electronic models often employ a foot pedal interface that incorporates speed and/or directional controls. A typical foot pedal control includes an on/off switch, a right/left turn interface, and a variable speed control. The speed control can be a rotary or linear varistor (variable resistor). In some models currently on the market, speed control is achieved by providing a speed control module which is used to pre-set a desired speed level, a "constant on" switch (which, when activated, maintains the desired speed at the selected level), and a tap switch or similar mechanism that can be depressed to momentarily increase the motor speed up to the pre-set level. Such a tap switch is normally a momentary contact switch (a depress-and-hold version, disengaging when pressure is released). Using such a device, the operator would select a speed and achieve it by engaging either the constant on switch or momentary tap switch, and then proceed to steer the watercraft through the right/left turn interface.

The problem with many current models is that, while they seek to provide fine speed and directional control to address wind and water current conditions, they are often difficult to work with and of limited use in the face of changing conditions. For example, a wind gust can push a watercraft out of a desired location above a target fishing hole by forcing the watercraft bow to the side and leaving it vulnerable to further gusts against the watercraft side. Having only one pre-set speed and a cumbersome mechanism for changing that speed is not desirable, as it is difficult if not impossible to counter such rapidly changing environmental conditions. A slide bar switch (a linear varistor) often sticks or binds, and any type of speed control that requires manual adjustment is difficult to work with while controlling a watercraft utilizing an electric trolling motor, particularly where constant fine adjustment is necessary. Rather than enjoying a day of fishing, the person spends most of their time in the frustrating task of constantly shifting the speed and directional controls to maintain the desired position.

Prior attempts to resolve this problem include those disclosed in U.S. Pat. Nos. 5,892,338 and 6,054,831, both assigned to Zebco Corporation of Tulsa, Okla. (the "Zebco patents"). In nearly identical disclosures, the Zebco patents teach a radio frequency remote control device for trolling motors. As can be seen particularly in FIG. 6 of the drawings in each of the Zebco patents, there are a number of speed control options that allow an operator to increase or decrease the trolling motor speed. Specifically, a maximum switch 108 allows the operator to immediately select full trolling motor speed with the depression of a button. Also, fast switch 106 and slow switch 110 enable the operator to adjust the trolling motor speed level up or down as desired.

However, while the Zebco patents do provide useful speed control options, they suffer from some limitations in their usefulness. For example, the maximum switch 108 does enable the operator to select the maximum throttle speed afforded by the trolling motor by depressing the switch 108. Depressing switch 108 results in the trolling motor increasing from the operator selected base speed to the trolling motor's full speed. Using such a maximum speed control device results in extreme stresses to the trolling motor mounting system and excessive speeds render fine steering practically impossible, potentially resulting in dangerous situations when close to shore or other watercraft. This feature essentially provides the watercraft operator with a hook rescue mechanism, where the fishing lure has been snagged on some underwater obstacle and retrieval requires full speed of the trolling motor to return the watercraft to the position of the snagged hook, but not a means to address shifting wind and water current conditions.

In addition, the fast switch and slow switch fail to provide the ease and precision of electric trolling motor speed control operation desired by watercraft operators. The fast switch simply increases the trolling motor speed by one increment with a single depression of the switch, while holding the switch depressed ramps up the speed; the slow switch provides the opposite result, decreasing the speed. Essentially, such switches simply replace the standard rotary or slide bar speed selector controls, requiring the operator to repeatedly depress the slow and fast switches to achieve the desired speed for the prevailing conditions. The necessity for the operator to break concentration and depress the speed control switches one increment at a time in an effort to compensate for varying wind and water current conditions decreases the operator's ability to effectively engage in fishing. If the fast switch is depressed and held for a number of seconds, the trolling motor speed will increase, but small inaccuracies in switch depression timing can result in erratic trolling motor speed changes thereby necessitating that the operator expend time and attention to correct the speed control setting.

The result of developments thus far in the art is the provision of various types of speed controls that, while providing improvements in some respects over the hand-operated trolling motors of the past, fail to address the requirements of trolling in varying environmental conditions. Wind and water current changes are a frustrating reality for those engaged in trolling, and the existing control devices are inadequate in addressing that reality.

SUMMARY OF THE INVENTION

According to a first aspect of the present invention there is provided a control for controlling speed of a motor for a watercraft, the control in communication with the motor and comprising:

a base;

a power supply connected to the base;

a base speed system comprising:

a base speed set means on the base for pre-setting a base speed level; and a base speed activation means on the base for directing the motor to operate at the base speed level; and a reset speed system comprising:
 a reset speed set means on the base for pre-setting a reset speed amount; and
 a reset speed activation means on the base for directing the motor to operate at a speed beyond the base speed level by the reset speed amount.

According to a second aspect of the present invention there is provided a control for controlling both speed and steering of a motor for a watercraft, the control in communication with the motor and comprising:

a base;

an interface pivotally connected by a pivot to the base, the pivot separating and defining a first end and a second end of the interface, such that depressing the first end directs the motor to steer the watercraft in a first direction and depressing the second end directs the motor to steer the watercraft in a second, opposed direction;

a power supply connected to the base;

a base speed system comprising:
 a base speed set means on the base for pre-setting a base speed level; and
 a base speed activation means on the base for directing the motor to operate at the base speed level; and a reset speed system comprising:
 a reset speed set means on the base for pre-setting a reset speed amount; and
 a reset speed activation means on the base for directing the motor to operate at a speed beyond the base speed level by the reset speed amount.

In some exemplary embodiments of the present invention, the control is foot-operated and the interface is a foot interface, the interface is pivotally connected at a generally central point to the base, and the first direction is to the right or starboard of the watercraft and the second, opposed direction is to the left or port of the watercraft. The control preferably comprises power activation means for selectively activating the control. Preferably, the power activation means, base speed set means, reset speed set means, base speed activation means, and reset speed activation means are devices whose signals are controlled by a circuit board, and the control communicates with the motor by radio-control means or cable electronics. The reset speed activation means is preferably but not necessarily a tap switch on the first end of the foot interface for ease of use, and the base speed set means and reset speed set means are preferably rotary or linear variable resistance devices. The foot-operated control also preferably comprises a reset speed system activation switch which enables the use of a single switch (tap switch) for both base speed activation means and reset speed activation means depending on whether it is switched on.

According to another aspect of the present invention, a first method of using the present invention is provided comprising the steps of:

(a) manipulating the base speed set means to set the base speed level;

(b) manipulating the reset speed set means to set the reset speed amount;

(c) causing the motor to operate at the base speed level by activating the base speed activation means; and (d) causing the motor to operate at a speed beyond the base speed level by the reset speed amount by activating the reset speed activation means when desired due to shifting environmental conditions.

According to a further aspect of the present invention, a second method of using the present invention is provided comprising the steps of:

(a) manipulating the base speed set means to set the base speed level;

(b) causing the motor to operate at the base speed level by activating the base speed activation means;

(c) manipulating the reset speed set means to set the reset speed amount; and (d) causing the motor to operate at a speed beyond the base speed level by the reset speed amount by activating the reset speed activation means when desired due to shifting environmental conditions.

The present invention accordingly addresses the need for a control device that effectively responds to shifting environmental conditions, as is described more fully below. A detailed description of an exemplary embodiment of the present invention is given in the following. It is to be understood, however, that the invention is not to be construed as limited to this embodiment.

BRIEF DESCRIPTION OF THE DRAWINGS

In the accompanying drawings, which illustrate the exemplary embodiment of the present invention.

DETAILED DESCRIPTION OF AN EXEMPLARY EMBODIMENT

Figure 1:
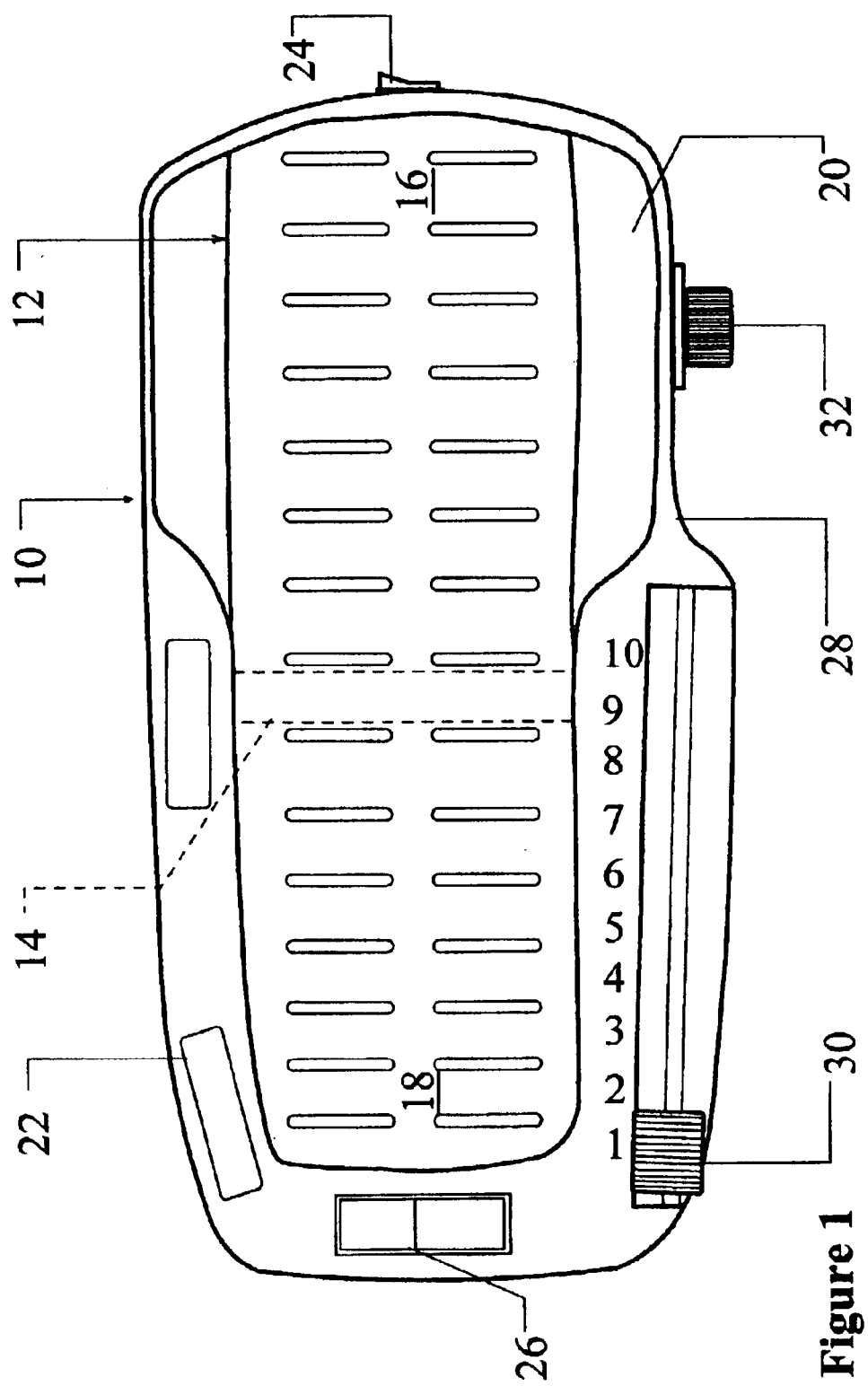
FIG. 1 is a top plan view of a control according to the present invention.
Figure 2:
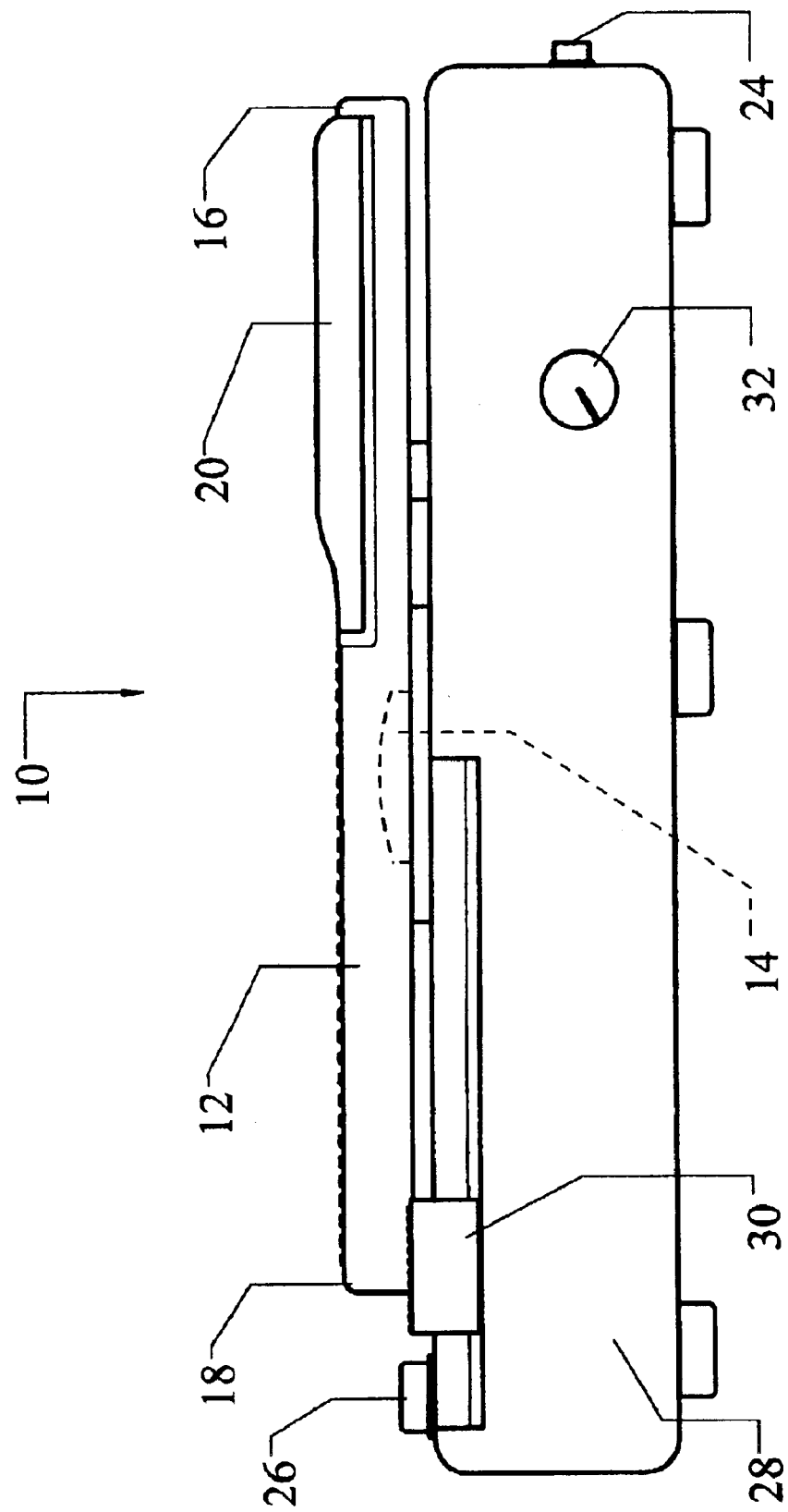
FIG. 2 is a side elevational view of the control showing the location of the reset speed set means.

Referring now in detail to the accompanying drawings, there is illustrated an exemplary embodiment of the foot-operated control of the present invention generally referred to by the numeral 10. As can be seen in FIGS. 1 and 2, control 10 comprises a base 28 and a foot interface 12, the foot interface 12 connected to the base 28 at a pivot 14 which runs in a line across the upper surface of the base 28. The foot interface 12 is the primary means of controlling the trolling motor steering direction while engaged in trolling. The foot interface 12 has a first end 16 which, when depressed, directs the trolling motor (not shown) by means of radio-control electronics, cable electronics, or other suitable means well known in the art to steer the watercraft (not shown) to the starboard, or right. The foot interface 12 also has a second end 18 which, when depressed in like fashion, directs the trolling motor to steer the watercraft to the port, or left.

The control 10 is fitted with appropriate power supply devices (not shown), depending on whether it is a remote radio-controlled device or hard-wired with an electrical cable, and an on/off switch 24 allows that power supply to direct power into the circuit electronics of the control 10.

The control 10 is fitted with two speed set means, a base speed set means 30 and a reset speed set means 32. These can take any suitable form known to the person skilled in the art, but in the exemplary embodiment the former is a linear variable potentiometer with a slide bar operator and the latter is a rotary linear or non-linear potentiometer. The base speed set means 30 are used to establish a base speed that would be employed when wind and water conditions were relatively calm or consistent. The reset speed set means 32, however, are used to establish an increased amount of speed that would be demanded of the trolling motor in addition to the base speed level when, for example, a wind gust arises and the operator of the trolling motor must try to maintain the watercraft's position.

A reset speed control system on/off switch 26 is also included on the control 10 to allow an operator to choose whether or not to have the reset speed control system activated; on very calm days, it might not be necessary and can be deactivated. On days where water current, wave, or wind activity might become a factor in controlling the watercraft, the operator can activate the reset speed control system via the reset speed control system on/off switch 26.

There are two trolling motor speed activation switches on the control 10 of the exemplary embodiment, a momentary contact "tap" switch 20 and a "constant on" switch 22. The use of these switches is outlined in the materials following.

Figure 3:
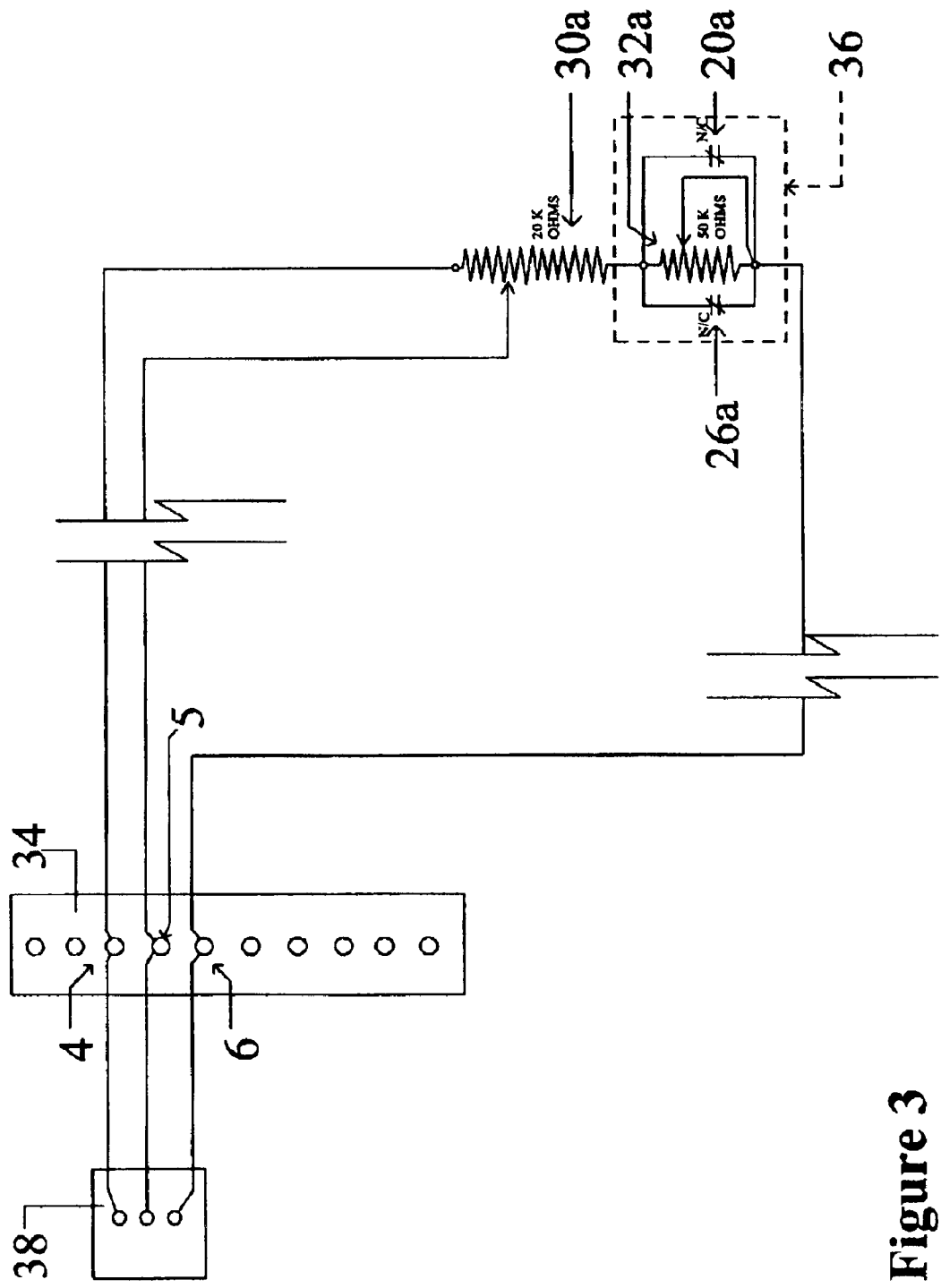
FIG. 3 is a schematic illustration of the circuitry employed in the exemplary embodiment.

FIG. 3 illustrates a preferred circuitry arrangement that is employed in the exemplary embodiment. On the upper left of the Figure is the circuit board terminal block 34, which is connected to the speed control elements in the lower right of the Figure. The interface circuit board 38 is connected to the terminal block 34, as is the base speed control potentiometer 30a. The speed control circuitry functions as a voltage divider and comprises base speed control potentiometer 30a (connected to the base speed set means 30) and reset speed control circuitry 36. Within the reset speed control circuitry 36 are the tap switch circuitry 20a (connected to the tap switch 20), reset speed control system on/off circuitry 26a (connected to the reset speed control system on/off switch 26), and a reset speed control potentiometer 32a (connected to the reset speed set means 32). The wiper terminal of the base speed control potentiometer is connected to a terminal 5 of the circuit board terminal block 34, which in turn is connected to the interface circuit board 38. The top terminal of the base speed control potentiometer 30a is connected to a terminal 4 of the circuit board terminal block 34, which in turn is connected to the interface circuit board 38. The bottom terminal of the base speed control potentiometer 30a is connected through the reset speed control circuitry 36, which connects to a terminal 6 of the circuit board terminal block 34, which in turn is connected to the interface circuit board 38. This arrangement allows for the reset speed control circuitry 36 to be selected by the operator of the control 10; otherwise, the base speed control potentiometer 30a enables operation of the trolling motor at the adjustable base speed level alone. The reset speed control system on/off circuitry 26a and tap switch circuitry 20a are normally closed, allowing a by-pass of the reset speed control circuitry 36 unless opened by the operator of the control 10. When both the reset speed control system on/off circuitry 26a and the tap switch circuitry 20a are open, the variable resistance of the reset speed control potentiometer 32a is added in series with the base speed control potentiometer 30a, thereby recalibrating (increasing) the voltage output from the wiper terminal of the base speed control potentiometer 30a to the terminal 5 of the circuit board terminal block 34, which is connected to the interface circuit board 38. The result is an increase in trolling motor speed above the selected base speed level, which is determined by the operator's selected set point of the reset speed control potentiometer 32a.

The utility of the present invention becomes clear in the following situation. Prior to utilizing the control 10, the operator would activate the on/off switch 24 and set the trolling motor base speed level according to the prevalent wind and water current conditions affecting the watercraft using the base speed set means 30. Once out on the water with the watercraft positioned as desired, the operator activates the trolling motor using either the tap switch 20 or the "constant on" switch 22. Trolling motor steering would be achieved by using the first and second ends 16, 18 of the foot interface 12.

However, if the environmental conditions are such that there will be gusts of wind or changing water currents affecting the watercraft, for example, the reset speed control system will be required. The operator would, in addition to setting the base speed level using the base speed set means 30, establish an appropriate reset speed level to counter the expected conditions using the reset speed set means 32. If the operator of the control 10 selects "constant on" mode (continuous trolling motor thrust) by momentarily depressing the "constant on" switch 22, the trolling motor will provide continuous thrust at the selected base speed level and the operator would steer the trolling motor to maintain the desired position of the watercraft. When wind and/or water currents begin to adversely affect the ability of the operator to maintain the desired position or course, the operator would activate the reset speed control system on/off switch 26, which opens the normally closed reset speed control system on/off circuitry 26a and readies the reset speed control system. When a gust of wind or water current begins to adversely affect the watercraft position, the operator would activate the reset speed control system by depressing the tap switch 20, thereby opening the tap switch circuitry 20a. The activation of tap switch 20 results in a trolling motor speed increase ranging in increments from ½-speed up to 9 speeds as dictated by the operator's selected set point of the reset speed set means 32. The speed increase is achieved by connecting the resistance of the reset speed control potentiometer 32a in series with the base speed control potentiometer 30a. The resulting increase in trolling motor speed provides the operator with the ability to counter the increased wind or water current forces affecting the watercraft and maintain the watercraft's position and direction as desired. When the wind or water currents susbside, the operator releases or deactivates the tap switch 20 which closes the tap switch circuitry 20a and thereby reduces the total resistance of the speed control circuit back to the base speed set point of the base speed control potentiometer 30a which quickly reduces the trolling motor speed back to the base speed level.

If the operator chooses to operate the trolling motor control 10 in the momentary thrust mode, where thrust is provided by maintained depression of the tap switch 20, rather than the "constant on" mode of operation, the operator would select a desired trolling motor base speed level by adjusting the base speed set means 30 to the desired speed for the existing wind and water current conditions. When the operator desires thrust from the trolling motor to manoeuvre or reposition the watercraft, the operator would depress the tap switch 20 mounted on the foot interface 12 for as long as the thrust was desired. Depression of the tap switch 20 provides almost instant trolling motor thrust at the base speed level previously selected by the operator of the control 10. The release of the tap switch 20 returns the trolling motor to the off cycle. In this mode of operation, the operator selects when to engage the trolling motor and when to disengage the trolling motor via depression and release of the tap switch 20. If wind or water current conditions are variable with gusts or of wind or changes in the water currents, the operator may activate the reset speed control system on/off switch 26 which opens the normally closed reset speed control system on/off circuitry 26a and readies the reset speed control system. The operator of the control 10 would then select the desired reset speed increase ranging in increments from ½ speed up to 9 speeds as dictated by the operator's selected set point of the reset speed set means 32. With the reset speed control system in the ready mode, the tap switch circuitry 20a opens when the operator of the control 10 depresses the tap switch 20 to engage the trolling motor, which connects the resistance of the reset speed control potentiometer 32a in series with that of the base speed control potentiometer 30a. The trolling motor will almost instantly start at the base speed level and then will cycle up to the reset speed selected by the operator. When the operator of the control 10 releases the tap switch 20, the trolling motor quickly cycles off and the opening of the tap switch circuitry 20a returns the speed control resistance to the base speed set point. Reactivation of the tap switch 20 will repeat the cycle of the trolling motor, engaging at the base speed level and quickly cycling up to the desired reset speed set point. The increase in trolling motor thrust provides the operator with the ability to quickly counter the increased wind or water currents' influence on the watercraft. When the elevated wind and/or water current conditions subside and the additional speed is no longer required, the reset speed control system on/off switch 26 is cycled off by the operator of the control 10. Cycling the reset speed control system on/off switch 26 to the off position closes the reset speed control system on/off circuitry 26a and returns the speed control system resistance to the set point of the base speed control potentiometer 30a and therefore the trolling motor speed returns to the selected base speed level.

For example, in momentary thrust mode, if conditions are such that the operator expects relatively calm wind and water conditions, the operator might set the base speed set means 30 at "2" and the reset speed set means 32 at "3" (the precise figures would depend on the calibration of the particular control device). With this arrangement, the trolling motor would be engaged by the operator depressing and holding the tap switch 20, which would cycle the trolling motor on at the selected base speed level. When the operator releases the tap switch 20, the trolling motor cycles to off. When wind gusts or water currents adversely affect the operator's ability to control the watercraft, the operator switches on the reset speed control system on/off switch 26. The activation of the tap switch 20 will now cycle the trolling motor on at the base speed level and then will recalibrate the trolling motor speed up 3 speeds to the reset speed of "5" as determined by the reset speed set means 32 set point. The increase in trolling motor speed will afford the operator the ability to counter the wind and/or water current effects on the watercraft. Releasing the tap switch 20 will cycle the trolling motor off. Reactivation of the tap switch 20 after a 2-second off cycle will repeat the trolling motor starting at the base speed and then cycling up to the reset speed. When the wind and/or water current conditions return to relative calm, the operator can simply switch off the reset speed control system to return the trolling motor operation to the base speed level with momentary thrust, on/off control.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. The invention is therefore to be considered limited solely by the scope of the appended claims.

Embodiments of the invention in which an exclusive property or privilege is claimed are defined as follows:

1. A control for controlling speed of a motor for a watercraft, the control in communication with the motor and comprising:
    a base;
    a power supply connected to the base;
    a base speed system comprising:
        a base speed set means on the base for pre-setting a base speed level; and
        a base speed activation means on the base for directing the motor to operate at the base speed level; and
    a reset speed system comprising:
        a reset speed set means on the base for pre-setting a reset speed amount; and
        a reset speed activation means on the base for directing the motor to operate at a speed beyond the base speed level by the reset speed amount.

2. A control for controlling both speed and steering of a motor for a watercraft, the control in communication with the motor and comprising:
    a base;
    an interface pivotally connected by a pivot to the base, the pivot separating and defining a first end and second end of the interface, such that depressing the first end directs the motor to steer the watercraft in a first direction and depressing the second end directs the motor to steer the watercraft in a second, opposed direction;
    a power supply connected to the base;
    a base speed system comprising:
        a base speed set means on the base for pre-setting a base speed level; and
        a base speed activation means on the base for directing the motor to operate at the base speed level; and
    a reset speed system comprising:
        a reset speed set means on the base for pre-setting a reset speed amount; and
        a reset speed activation means on the base for directing the motor to operate at a speed beyond the base speed level by the reset speed amount.

3. The control of claim 2 wherein the control is foot-operated and the interface is a foot interface.

4. The control of claim 2 wherein the interface is pivotally connected at a generally central point by a pivot to the base.

5. The control of claim 1 further comprising power activation means for selectively activating the control.

6. The control of claim 2 wherein the first direction is to the right or starboard of the watercraft and the second, opposed direction is to the left or port of the watercraft.

7. The control of claim 1 wherein signals from the base speed set means, reset speed set means, base speed activation means, and reset speed activation means are controlled by a circuit board.

8. The control of claim 2 wherein the reset speed activation means are a tap switch on the first end of the interface.

9. The control of claim 1 wherein the base speed set means and reset speed set means are rotary variable resistance devices.

10. The control of claim 1 wherein the base speed set means and reset speed set means are linear variable resistance devices.

11. The control of claim 1 further comprising reset speed system activation means for selectively activating the reset speed system.

12. The control of claim 1 wherein the control communicates with the motor through radio-control means.

13. The control of claim 1 wherein the control communicates with the motor through cable electronics.

14. A method of using the control of claim 1 comprising the steps of:
   (a) manipulating the base speed set means to set the base speed level;
   (b) manipulating the reset speed set means to set the reset speed amount;
   (c) causing the motor to operate at the base speed level by activating the base speed activation means; and
   (d) causing the motor to operate at a speed beyond the base speed level by the reset speed amount by activating the reset speed activation means when desired due to shifting environmental conditions.

15. A method of using the control of claim 1 comprising the steps of:
   (a) manipulating the base speed set means to set the base speed level;
   (b) causing the motor to operate at the base speed level by activating the base speed activation means;
   (c) manipulating the reset speed set means to set the reset speed amount; and
   (d) causing the motor to operate at a speed beyond the base speed level by the reset speed amount by activating the reset speed activation means when desired due to shifting environmental conditions.

16. A method of using the control of claim 2 comprising the steps of:
   (a) manipulating the base speed set means to set the base speed level;
   (b) manipulating the reset speed set means to set the reset speed amount;
   (c) causing the motor to operate at the base speed level by activating the base speed activation means;
   (d) causing the motor to operate at a speed beyond the base speed level by the reset speed amount by activating the reset speed activation means when desired due to shifting environmental conditions; and
   (e) manipulating the interface to steer the watercraft in a desired direction.

17. A method of using the control of claim 2 comprising the steps of:
   (a) manipulating the base speed set means to set the base speed level;
   (b) causing the motor to operate at the base speed level by activating the base speed activation means;
   (c) manipulating the reset speed set means to set the reset speed amount;
   (d) causing the motor to operate at a speed beyond the base speed level by the reset speed amount by activating the reset speed activation means when desired due to shifting environmental conditions; and
   (e) manipulating the interface to steer the watercraft in a desired direction.

* * * * *